INVENTORS
EUGENE HUGO AUGUSTIN
RICHARD MICHAEL KUDRZYCKI
BY
John R. Faulkner
William E. Johnson
ATTORNEYS INVENTORS
EUGENE HUGO AUGUSTIN
RICHARD MICHAEL KUDRZYCKI
BY John R. Faulkner
William E. Johnson
ATTORNEYS United States Patent Office 3,621,619
Patented Nov. 23, 1971

3,621,619
GLASS EDGE GRINDING MACHINE
Eugene H. Augustin, Dearborn Heights, and Richard M. Kudrzycki, Detroit, Mich., assignors to Ford Motor Company, Dearborn, Mich.
Filed Apr. 13, 1970, Ser. No. 27,558
Int. Cl. B24b 9/10
U.S. Cl. 51—102          9 Claims

ABSTRACT OF THE DISCLOSURE

An improved glass edge grinding machine includes the following structure. A first grinding element and a second grinding element are mounted on a rotatable spindle and the elements have exposed circumferential surfaces for contacting opposed corners of an edge of a glass sheet. The grinding elements are mounted about an axis of the spindle in a spaced relationship such that the exposed circumferential surface of each element presents a continuous grinding surface for one of the corners of the edge of the glass sheet. A positioning device is located in the space between the grinding elements. The positioning device engages the central portion of the edge of the glass sheet placed between the grinding elements to position the corners of the glass sheet with respect to the grinding elements. In such a manner, the grinding elements accurately grind the corners of the glass sheet and remove the proper amount of stock therefrom.

BACKGROUND OF THE INVENTION

In the processing of glass sheets to produce individual glass brackets for use as automotive window glass, once an individual glass sheet is cut to a final shape, the edges of the glass sheet are ground so as not to be sharp. In grinding the edges of an individual glass sheet to remove sharp corners therefrom, it is desirable to remove only a selected amount of stock from the corners of the sheet in order to control the cost of the grinding operation.

Many edge grinding machines which remove stock from opposite corners of an edge of a glass sheet are known in the prior art. However, these machines generally have some problem in being economical in their use. Many known machines do not control the amount of stock removed from opposite corners of the edge of a glass sheet whereby the edge of the glass sheet is overground so that the final shape thereof is pointed. The removal of the excess stock, of course, results in a cost penalty because of the excessive wear and tear on both the grinding elements and the grinding machine. Also many prior art machines have no control as to the amount of stock removed from each of the opposed corners of the glass sheet as they are being ground. In other words, one corner of the glass sheet might be only slightly ground whereas the other corner of the glass sheet might be overground.

The edge grinding machine of this invention has been developed to grind the opposite corners of an edge of a glass sheet in a uniform manner. The machine also has been developed to function in a manner that it removes a selected amount of stock from each of the corners being ground during the grinding operation. With such a grinding machine, an economical grinding operation is assured in that excessive wear and tear is not occasioned on either the grinding elements or the grinding machine containing the same.

SUMMARY OF THE INVENTION

This invention relates to a glass edge grinding machine and, more particularly, to a glass edge grinding machine in which provision is made for properly positioning the edge of the glass sheet to be ground between a pair of grinding elements.

In particular, the glass edge grinding machine of this invention includes a first grinding element having an exposed circumferential surface for contacting one corner of an edge of a glass sheet and a second grinding element having an exposed circumferential surface for contacting the second corner of the edge of the glass sheet. The first and second grinding elements are rotatably mounted about an axis in opposed, spaced, parallel relationship. By such mounting, the exposed circumferential surfaces of the opposed grinding elements present continuous grinding surfaces for the corners of the edge of the glass sheet when the glass sheet is brought into contact therewith. A positioning device is located in the space between the opposed grinding elements. The positioning device engages the central portion of the edge of the glass sheet placed between the grinding elements. The device positions the corners of the glass sheet with respect to the grinding elements so that the grinding elements may accurately grind the same. The positioning device is mounted in the space between the first and the second grinding elements.

In greater detail, the positioning device is constructed, at least in part, by a ring member having an exposed circumferential edge. This edge engages the central portion of the glass sheet. The ring member is mounted for independent rotation about the same axis as the first and the second grinding elements are rotated.

In still greater detail, a braking mechanism is provided to control the rate of rotation of the ring member of the positioning device. This braking mechanism controls the rotational rate of the ring member to a rate below the rotational rate of the first and the second grinding elements.

DESCRIPTION OF THE PREFERRED EMBODIMENT

Figure 1:
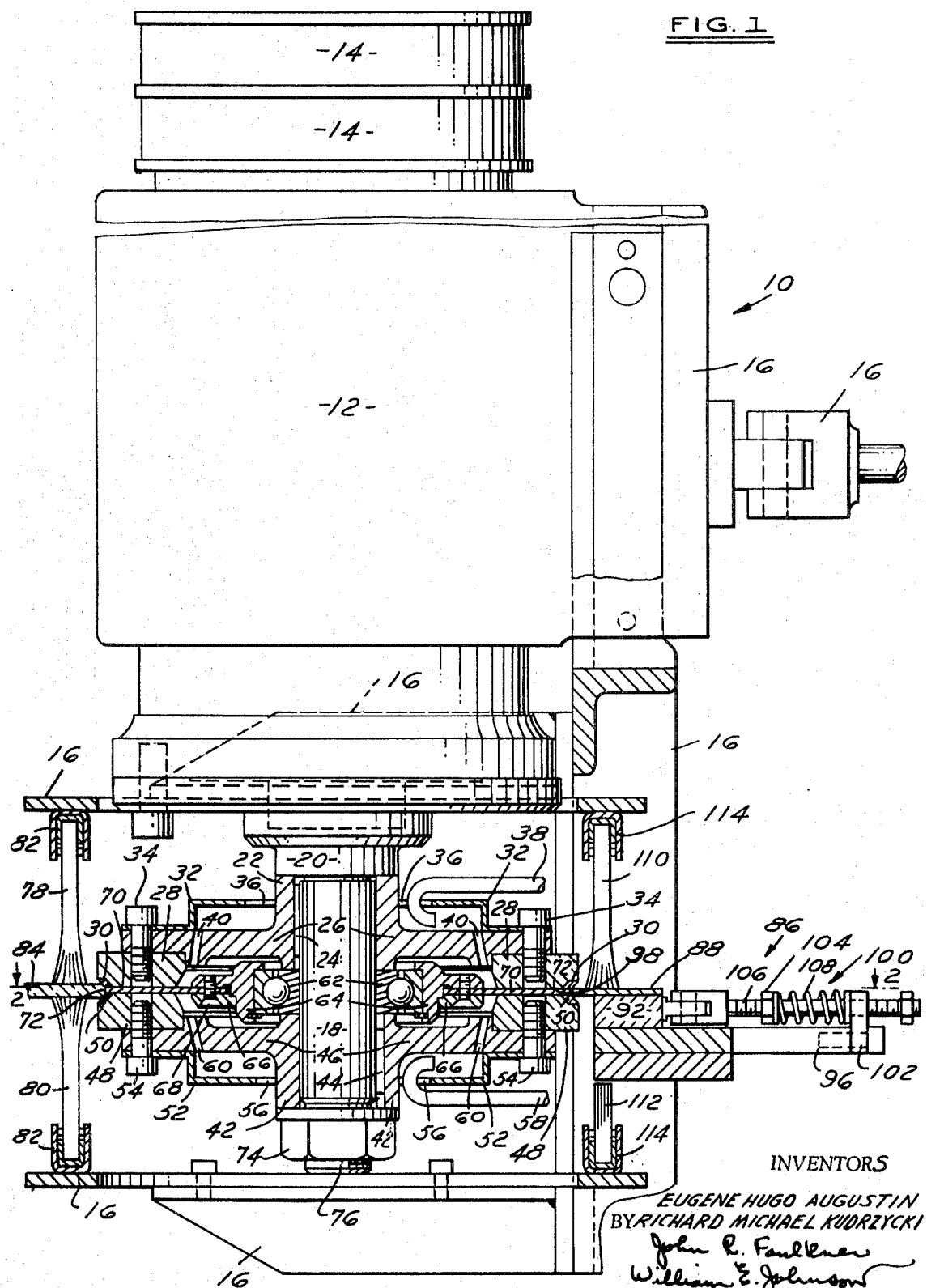
FIG. 1 is an elevational view, partly in cross section, of the glass edge grinding machine of this invention.

In FIG. 1 there is seen a glass edge grinding machine formed in accordance with the teachings of this invention. The machine is generally indicated by the numeral 10. In the machine, a gear drive mechanism 12 is driven by a pair of pulleys 14 which are operated in any suitable manner, as for example, by belts which are coupled to appropriate driving apparatuses. The gear drive mechanism is supported by a plurality of support members 16.

The gear drive mechanism 12 drives a spindle 18. This spindle is best seen in the lower portion of FIG. 1. The spindle supports most of the operative apparatus of the machine of this invention. For example, the spindle 18 has around the upper portion thereof a bushing 20 against which an upper mounting member 22 is positioned. The upper mounting member 22 is keyed to the shaft 18 by a key 24 and is driven thereby.

The mounting member 22 has an upper hub portion and a lower ring portion 26. An upper grinding element 28, having a ring construction with an exposed circumferential grinding surface 30, as well as an upper cover plate 32, are secured to the mounting member 22 by means of a plurality of bolts 34. The upper cover plate 32 has an opening 36 therein through which a tube 38 extends. Coolant is forced through the tube 38 to a space between the cover plate 32 and the upper mounting member. From this space, centrifugal force pushes the coolant down through passageways 40 in the upper mounting member and then to the exposed circumferential grinding surface 30 of the upper grinding element 28.

Below the upper mounting member 22, a lower mounting member 42 is secured to the spindle 18 for rotation therewith by means of a key 44. The lower mounting member has a ring portion 46 extending away from the hub portion thereof which encircles the spindle 18. A lower grinding element 48, having an exposed circumferential grinding surface 50, is formed in a ring shape similar to the ring shape of the grinding element 28. Similar to the upper construction, the lower grinding element 48 and a cover plate 52 are secured to the lower mounting member 42 by a plurality of bolts 54. The lower cover plate 52 has an opening 56 therein through which a delivery tube 58 extends. The delivery tube 58 delivers coolant to the space formed between the cover plate 52 and the lower mounting member 42, the coolant subsequently being delivered through passageways 60 to the exposed circumferential grinding surface 50 of the lower grinding element 48.

Intermediate the upper mounting member 22 and the lower mounting member 42 is a ball bearing assembly 62. The exterior race of this assembly supports thereabout a third mounting member comprised of upper and lower plates 64 and 66, respectively, fastened together by screws 68 (see FIG. 1). Gripped between the upper and lower plates 64 and 66 is a positioning plate 70. The positioning plate 70 is in the form of a ring-shaped element having an outer, exposed circumferential surface 72.

Figure 3:
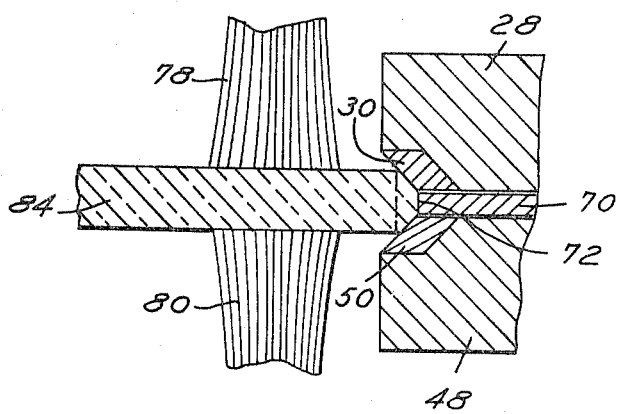
FIG. 3 in an enlarged sectional view showing the grinding of the corners of an edge of a glass sheet.

In the construction of the grinding machine, a clearance, such as is best seen in FIG. 3 of the drawings, is allowed between the positioning plate 70 and the upper and lower grinding elements 28 and 48. Since the positioning plate is mounted on a ball bearing assembly 62, the positioning assembly may rotate at a rate of rotation different than the rate of rotation of the upper and lower grinding elements.

The upper mounting member 22, the ball bearing assembly 62 and the lower mounting member 42 are all held in proper position on the spindle 18 by means of a nut 74. The nut 74 is applied to a threaded portion 76 on the lower part of the spindle 18.

As best viewed in the left portion of FIG. 1, there are located adjacent the grinding elements upper and lower brush members respectively designated 78 and 80. The brush members are supported in their positions on the supporting member 16 by means of U-shaped clips 82.

A glass sheet 84, originally having a flat edge thereon, is inserted between the brush members 78 and 80 in order for the edge to engage the circumferential grinding surfaces 30 and 50 of the grinding elements. The grinding elements grind off the corners of the edge of the glass as may be best seen in FIG. 3 in order to render the glass proper for use in various window constructions. The glass sheet is moved against the grinding elements in a manual operation. Thereafter the edge of the glass is continuously moved so that an ever changing portion thereof is brought into engagement with the grinding elements whereby stock is removed from the edges.

The positioning plate 70 engages the central portion of the edge of the glass sheet as the edge is ground. The positioning plate limits the amount of stock which may be removed from the corners of the edge of the glass sheet by the grinding elements. The positioning plate 70 also assists in locating the glass sheet so equal amounts of stock are removed from both the upper and lower corners of the glass sheet during the grinding operation. In such a manner, the grinding operation is accomplished by the apparatus of this invention in a manner such that generally equal amounts of stock are removed from both corners of the edge of a glass sheet. Also, a controlled amount of stock is removed from each of the ground edges.

Figure 2:
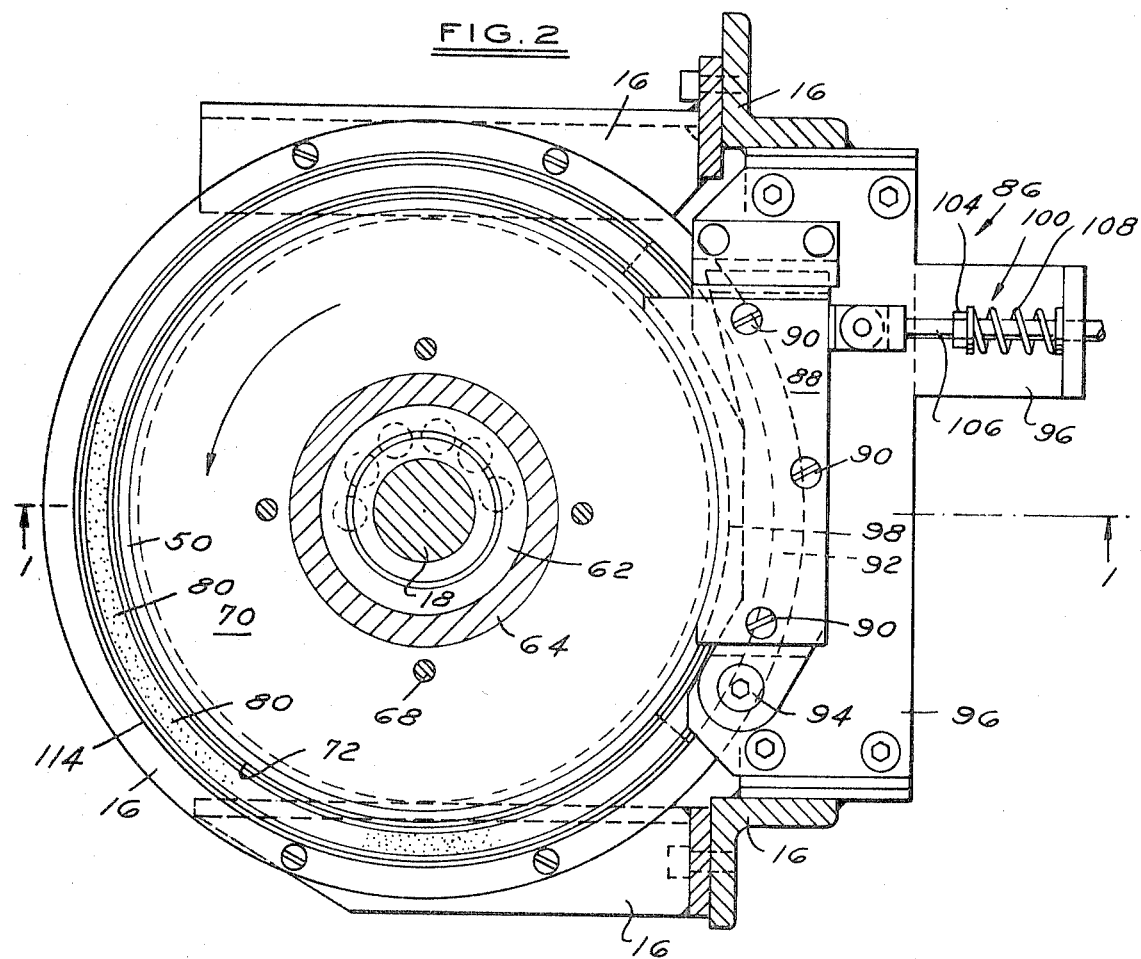
FIG. 2 is a plan view, partly in cross section, showing a portion of the apparatus of FIG. 1 and showing in greater detail the braking mechanism utilized in the machine.

In order to control the rotational rate of the positioning plate 70 to a rate below the rotational rate of the grinding elements 28 and 48, the machine 10 of this invention provides an adjustable braking mechanism designated by the numeral 86 (FIG. 2). The braking mechanism includes a brake shoe element 88 secured by a plurality of screws 90 to a pivotable plate 92. The plate 92 is pivotable about a pivot pin 94 over the surface of a supporting plate 96. The brake shoe element 88 has a surface 98 thereon which is cooperable with the outer surface 72 of the positioning plate 70 to apply a braking force thereto. A biasing mechanism 100 is secured at one end to the pivotable plate 92 and at the other end to the supporting plate 96 by a member 102. The position of a nut 104 on a threaded shaft 106 controls the amount of force a spring 108 applies to bias the brake shoe element 88 into engagement with the positioning plate 70. Brush members 110 and 112 (FIG. 1) are held by U-shaped clips 114 to the supporting structure 16 for the purpose of keeping coolant from flowing outwardly onto the brake mechanism 100.

The invention disclosed will have many modifications which will be apparent to those skilled in the art in view of the teachings of this specification. It is intended that all modifications which fall within the true spirit and scope of this invention be included within the scope of the appended claims.

We claim:

1. In a glass edge grinding machine the improvement which comprises:
   a first grinding element having an exposed circumferential surface for contacting one corner of an edge of a sheet of glass;
   a second grinding element having an exposed circumferential surface for contacting the second corner of the edge of the sheet of glass;
   means for rotatably mounting said first and said second grinding elements about an axis in a spaced parallel relationship such that the said exposed circumferential surfaces of said elements present continuous grinding surfaces for the corners of the edge of the glass sheet when the glass sheet is brought in contact therewith;
   positioning means located in said space between said first and said second grinding elements for engaging the central portion of the edge of the glass sheet placed between said grinding elements thereby to position the corners of the glass sheet with respect to said grinding elements whereby said grinding elements accurately grind the same; and
   means for mounting said positioning means in said space between said first and said second grinding elements.

2. The improved glass edge grinding machine as defined in claim 1 wherein said mounting means mounts said positioning means for independent rotation about the same axis as said grinding elements are mounted, and wherein said positioning means is defined at least in part by a ring member having an exposed circumferential surface which engages the central portion of the edge of the glass sheet.

3. The improved glass edge grinding machine as defined in claim 2 further including: brake means cooperative with said positioning means for controlling the rotational rate of said positioning means to a rate lower than the rotational rate of said grinding elements.

4. A glass edge grinding machine which comprises:
   a rotational spindle;
   first mounting means attached to said spindle for rotation therewith;
   first circular grinding means secured to said first mounting means for rotation therewith about the central axis of said spindle, said grinding means having an exposed, circumferential grinding edge for grinding one corner of the edge of a glass sheet;

second mounting means attached to said spindle for rotation therewith; said second mounting means being spaced axially along said spindle from said first mounting means;

second circular grinding means secured to said second mounting means for rotation therewith about the central axis of said spindle, said second grinding means having an exposed circumferential grinding edge for grinding the second corner of the edge of the glass sheet, said grinding edges of said two grinding means being in a spaced parallel relationship when said two mounting means are associated with said spindle;

third mounting means providing a portion thereof freely rotatable about said spindle, said third mounting means being secured to said spindle at a position intermediate said first and said second mounting means; and positioning means secured to said third mounting means for projecting to a position between at least the portion of said grinding edges of said two grinding means which engage the edge of the glass sheet to be ground, whereby said positioning means engages the central portion of the edge of glass sheet which is having the edges thereof ground by said grinding edges.

5. The glass edge grinding machine of claim 4 wherein said positioning means is defined at least in part by a ring member having an exposed circumferential surface which engages the central portion of the edge of the glass sheet.

6. The glass edge grinding machine of claim 5 further including:

brake means cooperative with said positioning means for controlling the rotational rate of said positioning means to a rate lower than the rotational rate of said two grinding means.

7. The edge grinding machine of claim 6 wherein: said brake means includes: a brake shoe element having an arcuate surface cooperable with said exposed surface of said positioning means for applying braking pressure thereto; means for mounting said brake shoe element on a pivot; and spring means for biasing said arcuate surface of said brake shoe element about said pivot and into engagement with said exposed surface of said positioning means.

8. The edge grinding machine of claim 7 wherein: said spring means of said brake means is adjustable to control the braking pressure applied by said brake shoe element to said positioning means.

9. The edge grinding machine of claim 4 further including: means for supplying coolant to said first and said second grinding means to cool the same during the grinding operation and to remove therefrom the grinding dust formed in the grinding operation.

References Cited

UNITED STATES PATENTS

| | | | |
|---|---|---|---|
| 2,161,992 | 6/1939 | Battocchi | 51—102 |
| 2,710,496 | 6/1955 | Okey | 51—101.1 |
| 2,883,800 | 4/1959 | Reaser et al. | 51—101 |
| 2,906,065 | 9/1959 | Reaser | 51—101 |

OTHELL M. SIMPSON, Primary Examiner